Dec. 24, 1963 CHI M. TSANG 3,115,070
COMPOSITE PISTON
Filed Oct. 18, 1961 2 Sheets-Sheet 1
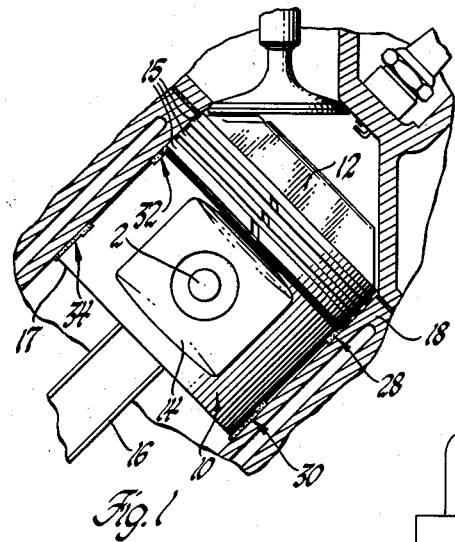
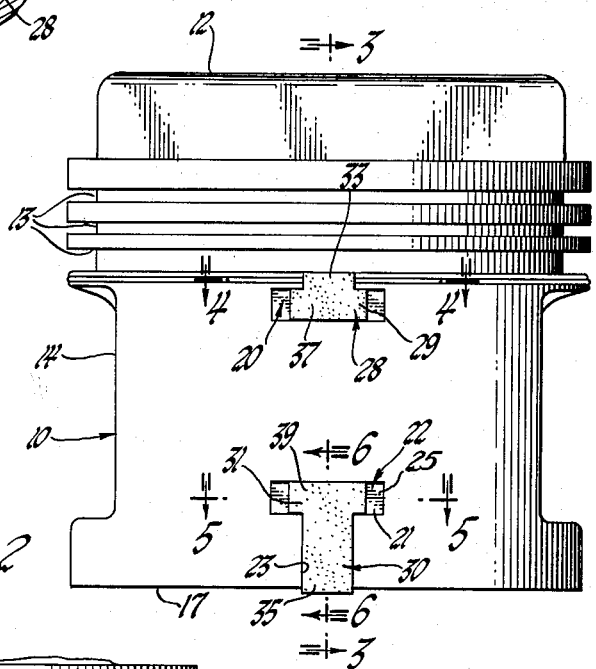
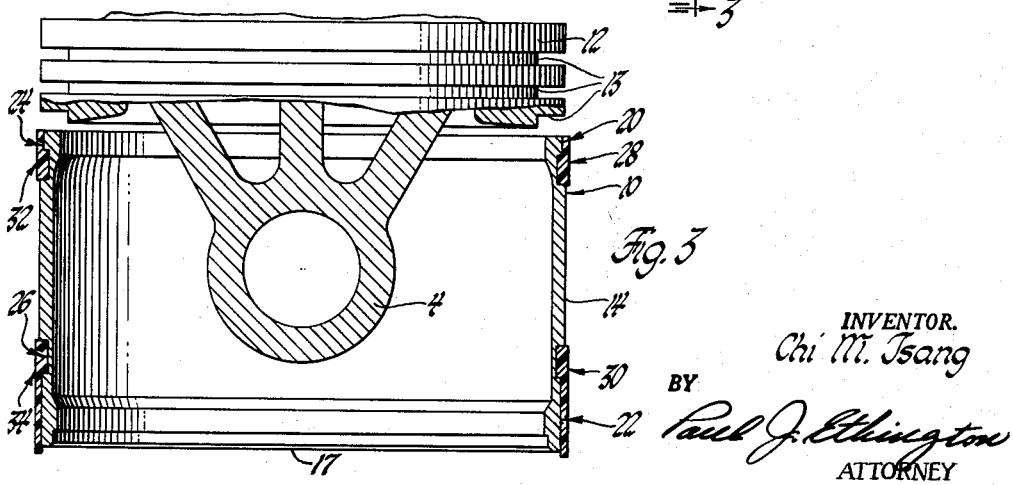
INVENTOR.
Chi M. Tsang
BY
Paul J. Ethington
ATTORNEY Dec. 24, 1963 CHI M. TSANG 3,115,070
COMPOSITE PISTON
Filed Oct. 18, 1961 2 Sheets—Sheet 2
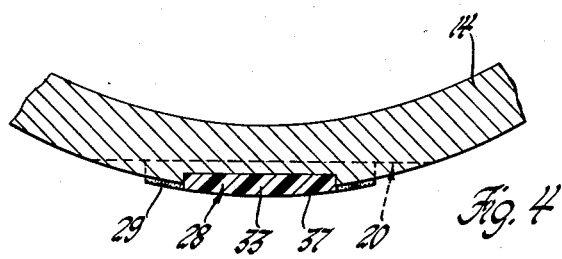
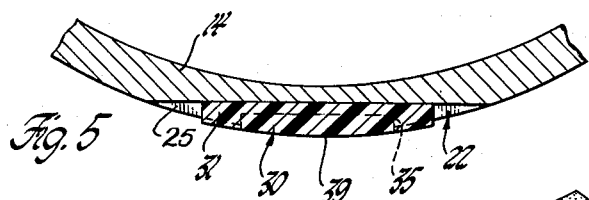
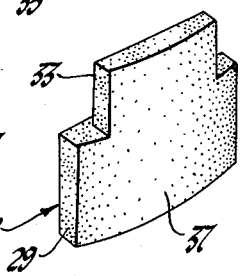
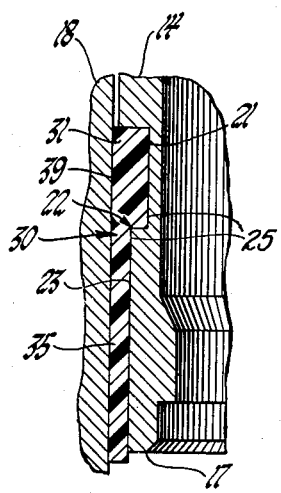
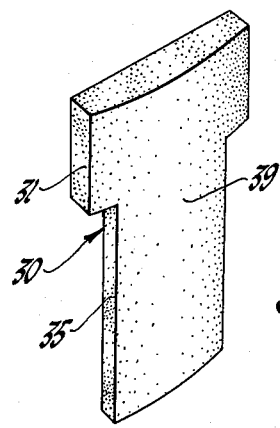
INVENTOR.
Chi M. Tsang
BY
Paul J. Ethington
ATTORNEY

United States Patent Office 3,115,070
Patented Dec. 24, 1963

3,115,070
COMPOSITE PISTON
Chi M. Tsang, Warren, Mich., assignor to General Motors Corporation, Detroit, Mich., a corporation of Delaware
Filed Oct. 18, 1961, Ser. No. 145,929
8 Claims. (Cl. 92—212)

The present invention relates to piston constructions and in particular to an improvement therein for cushioning side thrusts of a piston against a cylinder wall.

A piston mounted for reciprocal movement within a cylinder of an internal combustion engine is subject to lateral play or side thrust due to the necessary clearance between the piston and the surrounding cylinder wall and the angularity of the piston rod. Impact between the piston and the cylinder wall due to side thrust is commonly known as piston slap which provides objectionable noise in an engine otherwise noiseless and, in addition, may score the cylinder wall. The clearance between the piston and the cylinder wall increases with engine service as metal surfaces wear and hence piston slap becomes more prominent.

One form of the prior art for minimizing piston slap utilizes a cut-out portion of a piston skirt which is then fitted into the cut-out and spring biased into frictional engagement with a cylinder wall. Side thrusts of the piston are cushioned by a spring mounting the cut-out portion to the piston skirt. The device has a disadvantage in that the cut-out portion is made of the same material as is the piston skirt and when held in frictional engagement with the cylinder wall results in increased friction therebetween which may score the cylinder wall. In addition, such a device increases the net weight of the piston because the cut-out portion is mounted on the skirt by means of the spring and suitable securing means therebetween.

Another form of the prior art for minimizing piston slap utilizes a split collar mounted on a reduced diameter portion of a piston skirt. The configuration of the collar provides spring action to frictionally engage the outer surface of the collar with the cylinder wall and to cushion side thrusts of the piston. Such a device has a disadvantage in that it must rely on the particular configuration of the collar for cushioning side thrusts of the piston.

In accordance with the present invention, side thrusts of a piston against a cylinder wall are cushioned without scoring the cylinder wall, increasing the piston's net weight, utilizing a spring biased insert, or relying on a particular configuration of the cushioning means. A piston is provided having a skirt portion with a radially disposed recess therein. An insert is fitted with the recess and is adapted to be projected into yielding engagement with a cylinder wall. The insert is constructed of long wearing resilient material such as polytetrafluoroethylene so as to cushion side thrusts of the piston against the cylinder wall. The material is lighter than that from which the skirt portion is made and hence the piston's net weight is decreased. In addition, the resilient insert not only cushions side thrust of the piston against the cylinder wall but in doing so does not score the cylinder wall since the insert is constructed of softer material than is the cylinder wall.

A more complete understanding of the invention may be had from the detailed description which follows taken with the accompanying drawings in which:

FIGURE 1 is a sectional longitudinal view of a piston embodying the invention in an operative position in a co-acting cylinder.

FIGURE 2 is an elevational view of the piston.

FIGURE 3 is a central vertical sectional view of the piston taken on line 3—3 of FIGURE 2 looking in the direction of the arrows.

FIGURE 4 is a horizontal sectional view taken on line 4—4 of FIGURE 2 looking in the direction of the arrows.

FIGURE 5 is a horizontal sectional view taken on line 5—5 of FIGURE 2 looking in the direction of the arrows.

FIGURE 6 is a vertical sectional view taken on line 6—6 of FIGURE 2 looking in the direction of the arrows.

FIGURE 7 is a perspective view of one insert.

FIGURE 8 is a perspective view of another insert.

Referring now to the drawings and in particular to FIGURES 1, 2 and 3, there is shown an embodiment of the invention. A piston 10 preferably constructed using light material such as aluminium and having a head portion 12 and a skirt portion 14 is mounted to a connecting rod 16 for reciprocal movement within a cylinder 18 of an internal combustion engine. The connecting rod 16 is journaled on a piston pin 2 held in place by a pin carrier 4 (FIGURE 3) mounted on the underside of the head portion 12.

The head portion 12 is provided with a plurality of circumferentially disposed grooves 13 which are fitted with piston rings 15 (FIGURE 1) in any suitable manner. The rings 15, as is well known in the art, are provided for maintaining compression in the cylinder head and for preventing passage of burning gases past the head 12 to the piston skirt 14.

The piston skirt 14 is provided with a plurality of radially disposed recesses located in the thrust faces of the piston skirt and comprising the recesses 20, 22, 24 and 26 the vertical centerlines of which define a plane including the axis of the piston 10 and which is perpendicular to the axis of the piston pin 2. The recesses are T-shaped each comprising two flat perpendicularly disposed rectangular grooves terminating in a rigid surface. For example, the recess 22, as shown in FIGURE 2, is provided having a crossbar groove 21 and a stem groove 23 defining a T-shaped recess terminating in a rigid surface 25. The depth of the crossbar groove 21 is greater than the depth of the stem groove 23 as is shown in FIGURE 6. The crossbar groove 21 is preferably constructed having two parallel walls perpendicular to the piston's axis, whereas the stem groove 23 is preferably constructed having two walls parallel to the piston's axis. Recesses 20, 24 and 26 are constructed as is recess 22. However, the stem grooves of the T-shaped recesses 20 and 24 are shorter in length than the stem grooves of recesses 22 and 26 as seen in FIGURES 2 and 3 the purpose for which will be explained hereinafter. The recesses may be constructed by any suitable means such as machining or casting. If machined, the direction of feed for cutting the crossbar grooves should be perpendicular to the piston's axis, and the direction of feed for cutting the stem grooves should be parallel to the piston's axis.

The recesses 20, 22, 24 and 26 are fitted with inserts 28, 30 and 32 and 34, respectively. The inserts are T-shaped and correspond to the T-shaped recesses, i.e. the inserts' crossbar sections are thicker than are their stem sections in the same amount as the crossbar grooves of the recesses are deeper than are their stem grooves. For example, the inserts 28 and 30 as shown in FIGURES 7 and 8 comprise crossbar sections 29 and 31, respectively, which are constructed of greater thickness than are the stem sections 33 and 35, respectively. The outer surfaces 37 and 39 of the inserts 28 and 30, respectively, are convex and have radii of curvature greater than that of the piston skirt 14 as shown in FIGURES 4 and 5.

The inserts 28, 30, 32 and 34 are preferably constructed of synthetic resin material having the properties of being resilient, deformable and wear resistant such as polytetrafluorethylene. In addition, the material used should maintain its properties while withstanding the high temperatures of the piston skirt. The wearing properties of the inserts may be increased by filling them with such materials as graphite, glass or molybdenum disulfide.

The inserts are compressively fitted into place in the recesses by any suitable tool such that the crossbar and stems of the T-shaped inserts co-operate with the crossbar and stem grooves of the T-shaped recesses in the piston skirt 14. For example, in FIGURE 6, the insert 30 is shown in place in the recess 22 such that the crossbar section 31 fits in a co-operative manner with the crossbar groove 21 and that the stem section 35 fits in a cooperative manner with the stem groove 23.

The outer convex surfaces of the inserts protrude beyond the outer surface of the piston skirt 14 so as to be in yielding engagement with the wall of the cylinder 18. For example, in FIGURE 6, the insert 30 is shown protruding beyond the outer surface of the piston skirt 14 so that its outer convex surface 39 is held in yielding engagement with the wall of the cylinder 18. The stem sections of the inserts extend in the direction of the piston's axis beyond the bottom of the piston skirt so as to prevent metal to metal contact between the piston and the cylinder wall as is shown in FIGURE 6 in which the stem section 35 of the insert 30 extends beyond the bottom edge 17 of the piston skirt 14.

When the piston 10 is in its lowermost position in the cylinder 18, the lower edge of the piston skirt 14 may protrude beyond the lower edge of the cylinder 18, and hence there may be a tendency for the inserts 30 and 34 to pop out of the recesses 22 and 26, respectively. Therefore, the stem portions of the T-shaped recesses 22 and 26 and the respectively corresponding inserts 30 and 34 are extended in length in a direction parallel to the piston's axis to the extent that their crossbar portions will not extend beyond the lower edge of the cylinder 18 when the piston 10 is in its lowermost position. The walls of the T-shaped recesses prevent slippage of the inserts along the cylindrical surface of the piston skirt 14 in a direction perpendicular to the piston's axis and in a direction parallel to the piston's axis.

During reciprocal motion of the piston 10 within the cylinder 18, side thrusts of the piston due to angular positioning of the connecting rod will alternately compress and relieve the inserts thus preventing metal to metal contact between the piston skirt 14 and the cylinder wall 18, thereby preventing piston slap and the accompanying noise disturbances and scoring of the cylinder walls. If the side thrust of the piston 10 becomes excessive with respect to the cylinder wall the inserts may be completely compressed, permitting slight metal to metal impact between the piston skirt 14 and the cylinder 18. However, in all cases of side thrust piston slap will be either eliminated or greatly minimized due to the cushioning effect of the inserts.

Although the description of this invention has been given with respect to a particular embodiment it is not to be construed in a limiting sense. Numerous variations and modifications within the spirit and scope of the invention will now occur to those skilled in the art. For a definition of the invention, reference is made to the appended claims.

I claim:

1. A composite piston comprising a skirt portion, a pin carrier adapted to receive a piston pin, the skirt portion having a pair of separate radially disposed recesses located in a plane perpendicular to the longitudinal axis of the pin carrier each terminating in a rigid surface, and a pair of separate inserts each disposed in a different one of the recesses and adapted for engagement with a cylinder wall, each insert constructed of long wearing resilient material so as to cushion side thrusts of the piston against the cylinder wall.

2. A composite piston comprising a skirt portion, the skirt portion having a radially disposed recess terminating in a rigid surface, and an insert disposed in the recess and adapted for engagement with a cylinder wall, the insert constructed of polytetrafluoroethylene so as to cushion side thrusts of the piston against the cylinder wall.

3. A composite piston comprising a skirt portion, the skirt portion having a radially disposed recess terminating in a rigid surface and an insert disposed in the recess and adapted for engagement with a cylinder wall, the insert constructed of graphite filled polytetrafluoroethylene so as to cushion side thrusts of the piston against the cylinder wall.

4. A composite piston comprising a skirt portion, a pin carrier adapted to receive a piston pin, the skirt portion having a pair of separate radially disposed recesses located in a plane perpendicular to the longitudinal axis of the pin carrier each terminating in a rigid surface, and a pair of inserts each having an outer convex surface the radius of curvature of which is greater than that of the skirt portion, each insert being disposed in a different one of the recesses and adapted for engagement with a cylinder wall, each insert constructed of long wearing resilient material so as to cushion side thrusts of the piston against the cylinder wall.

5. In combination, a cylindrical piston having a skirt portion, the skirt portion having a radially disposed recess terminating in a rigid surface, and an insert disposed in the recess and adapted for engagement with a cylinder wall, the insert constructed of long wearing resilient material so as to cushion side thrusts of the piston against the cylinder wall, the recess adapted to prevent slippage of the insert in a direction parallel to the piston's axis and in a direction perpendicular to the piston's axis along the piston's cylindrical surface.

6. In combination, a piston having a skirt portion, the skirt portion having a radially disposed recess terminating in a rigid surface, the recess constructed having two walls parallel to the piston's axis and another two parallel walls perpendicular to the piston's axis, and an insert disposed in the recess and adapted for engagement with a cylinder wall, the insert constructed of long wearing resilient material so as to cushion side thrusts of the piston against the cylinder wall.

7. In combination, a piston having a skirt portion, the skirt portion having a radially disposed recess terminating in a rigid surface, the recess constructed having a T-shaped configuration, and a T-shaped insert disposed in the recess and adapted for engagement with a cylinder wall, the insert constructed of long wearing resilient material so as to cushion side thrusts of the piston against the cylinder wall.

8. In combination, a cylinder of an internal combustion engine, a piston mounted for reciprocal movement within the cylinder, the piston having a skirt portion, the skirt portion having upper and lower edges, first and second diametrically opposed recesses provided in the skirt portion each terminating in a rigid surface and located at the upper edge and extending downwardly therefrom, third and fourth diametrically opposed recesses provided in the skirt portion each terminating in a rigid surface and located at the lower edge and extending upwardly therefrom, the vertical centerlines of the recesses defining a plane including the piston's axis, and inserts disposed in the recesses, the inserts constructed of long wearing resilient material and having their outer surfaces convex and of greater radii of curvature than that of the piston skirt, the inserts being adapted for engagement with the wall of the cylinder so as to cushion side thrusts of the piston with respect to the wall of the cylinder.

References Cited in the file of this patent

UNITED STATES PATENTS

| | | |
|---|---|---|
| 1,195,306 | Werra | Aug. 22, 1916 |
| 2,063,210 | Wherry | Dec. 8, 1936 |